Dec. 19, 1961 F. THOMA 3,014,168
ELECTRONICALLY CONTROLLED CLOCK
Filed Dec. 27, 1956 2 Sheets-Sheet 1
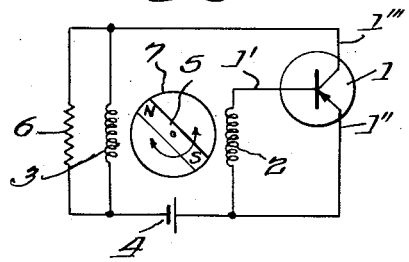
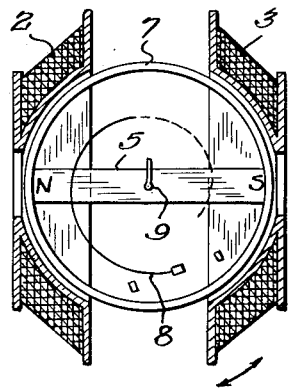
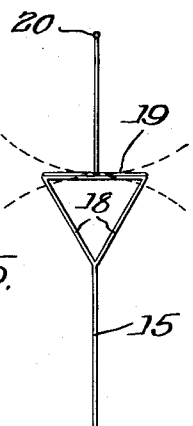
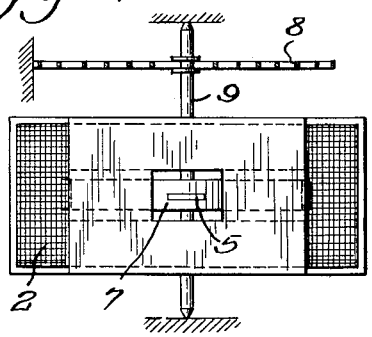
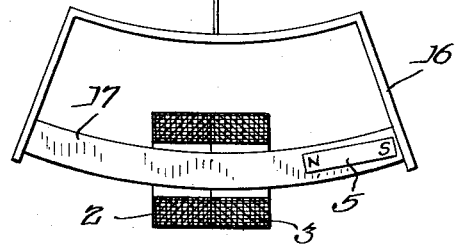
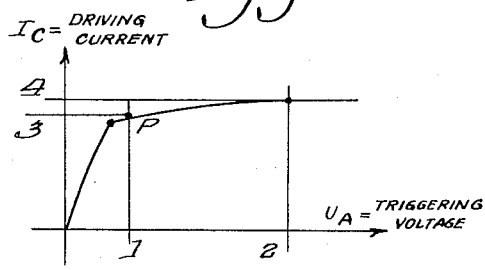
Inventor.
Fritz Thoma.
By
Atty Dec. 19, 1961 F. THOMA 3,014,168
ELECTRONICALLY CONTROLLED CLOCK
Filed Dec. 27, 1956 2 Sheets-Sheet 2
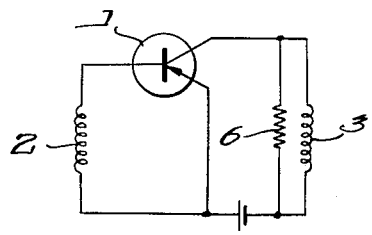
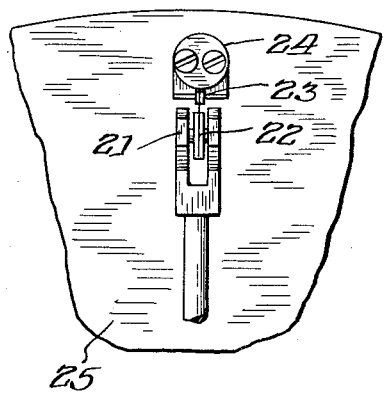
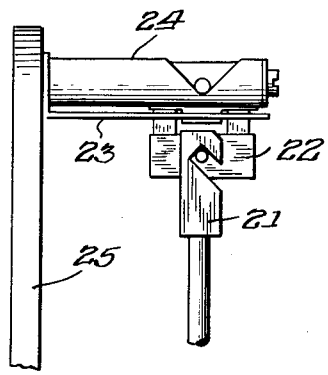
Inventor:
Fritz Thoma

United States Patent Office 3,014,168
Patented Dec. 19, 1961

3,014,168
ELECTRONICALLY CONTROLLED CLOCK
Fritz Thoma, St. Georgen, Black Forest, Germany, assignor to Kieninger & Obergfell, St. Georgen, Black Forest, Germany, a German company
Filed Dec. 27, 1956, Ser. No. 631,004
Claims priority, application Germany Dec. 28, 1955
1 Claim. (Cl. 318—132)

This invention relates to electric clocks and is particularly concerned with an electronically controlled clock.

There are mechanical oscillating structures known, especially pendulum drives and balances for clocks, wherein the oscillating element is a magnet, for example, a permanent magnet. Such magnet is affected by an electric circuit operating without the aid of contacts, for example, a coil, for the purpose of generating electrical impulses which in turn generate by means of a tube or a semiconductor device, especially transistor device, feedback impulses in a corresponding electric circuit, for imparting to the oscillating element a periodically effective driving force. The control is usually effected, without the aid of contacts, by means of two induction coils, namely, a generator coil in which electrical impulses are generated by the oscillating magnet, and a motor coil, which affects the oscillating magnet by driving impulses. In the case of a transistor feedback arrangement, the generator coil is usually connected in the emitter circuit, while the motor coil is connected in the collector circuit. There is in addition in the emitter-collector circuit current source, for example, a battery, which supplies the energy for maintaining the mechanical oscillations.

The object of the invention is to provide an electronically controlled clock which satisfies the most modern requirements, has an operating life as long as possible, and which operates reliably.

This object is in accordance with an embodiment of the invention realized by making the oscillating element in the form of a magnet rod which is disposed between two coils, a spiral spring being provided to rotate the magnet so as to induce in the coils simultaneously effective voltages of opposite polarities. One of the coils is connected as a generator coil in the input circuit of a transistor and the other coil is connected to the output circuit thereof and functions as a motor coil. A resistor is connected in parallel with one of the coils to suppress the tendency of the transistor circuit to oscillate. It is further of importance, for obtaining the smallest possible air gap, to make the two coils of a cross-section matched to the circle determined by the arcuate path of the oscillating magnet element.

The manner in which various objects and features of the invention are realized will appear from the description of embodiments which will be rendered below with reference to the accompanying drawings. In these drawings, FIG. 1 shows in schematic manner an embodiment of a balance wheel according to the invention, which is driven by a transistor circuit;

FIG. 2 is a front view of the balance wheel which is disposed between two coils;

FIG. 3 indicates a side view of the arrangement of FIG. 2;

FIG. 4 shows an explanatory curve;

FIG. 5 shows another embodiment of a clock pendulum with mechanical temperature compensation;

FIG. 6 is a circuit diagram showing the electronic control; and

FIGS. 7 and 8 are two views of an embodiment comprising a temperature-compensated pendulum.

In FIG. 1, numeral 1 indicates a transistor having a base 1', an emitter 1" and a collector 1'''. In the input circuit, that is, between the base 1' and the emitter 1", there is connected the generator coil 2. A motor coil 3 is similarly connected in the output circuit, that is, between the collector 1''' and the emitter 1". Numeral 4 indicates a current source, for example, a battery. It will be sufficient if the battery delivers a steady voltage of 1.5 volts. An air-oxygen element may for example be used as a battery; such element delivers constant voltage over periods of years so that the corresponding clock may be in operation for long times.

The following may be said as to the operation:

The magnet rod 5 induces in the generator coil 2 a current which affects the transistor. The battery accordingly delivers an impulse to the motor coil 3, the resulting magnetic field acting in driving manner on the opposite pole of the magnet 5. The balance wheel which also comprises an annular rim 7 is in this manner operated. A permanent magnet is preferentially used as a magnet.

As indicated in FIG. 1, a resistor 6 may be connected in parallel to the motor coil 3; the resistance may be on the order of about 5–10K ohms. It has been found that such resistor contributes to the stabilization of the transistor operation and that it counteracts at the same time the tendency of the transistor to oscillate.

It is important for the arrangement according to FIGS. 1 and 2 to dispose the magnetic balance wheel 5, 7 between coils 2 and 3. The cross-section of the coils is matched to the circumference of the oscillating balance. The smallest possible air gap and accordingly, a minimum of scattering are thereby obtained.

Attention may be called to the fact that it is possible to make the balance swing over more than 360°. A second impulse will in such case result.

The spiral spring 8 which is connected with the shaft 9 carrying the magnet rod 5 is apparent from FIG. 3. It has been omitted from the other figures for the sake of simplicity.

In accordance with the invention, other factors must be considered if it is desired to obtain optimal operation of the electronic control circuit, namely, (1) the oscillating element which may be a balance wheel or a pendulum, must incident to its oscillations draw as much energy from the generator coil as is necessary for exciting the transistor to such extent that the current flowing in the motor coil 3 may again supply energy to the pendulum that has been lost; (2) it is to be observed in this connection that the oscillating element, in drawing energy from the generator coil 2 is subjected to a braking force which affects the normal free swinging motion thereof; (3) a second disturbance of the free swinging motion of the oscillating element is caused by the driving pulse and attention is therefore to be paid to produce a drive impulse by means of the motor coil, which affects the oscillating element as briefly as possible; (4) this produces for the operation of the transistor the requirement that it must always deliver a drive impulse of predetermined magnitude despite triggering impulses of variable magnitude that may be caused, for example, by dropping battery voltage; and (5) the transistor accordingly must be so controlled that it is, in the case of a small amplitude of the oscillating element and therewith longer impulse duration, opened so much longer so that the dropping voltage and accordingly reduced output are compensated.

The control of these difficult conditions was in surprisingly simple manner effected by features which are applicable in pendulum clocks as well as in timepieces controlled by balance wheels. These features include the following.

(I) The generator coil, in the case of a given transistor, must be determined with respect to the motor coil, so far as the cross-sectional configuration and the number of ampere turns are concerned, that upon the curve of the driving current $I_C$ (FIG. 4) there will appear, depending upon the triggering voltage $U_A$, the workpoint at the point of transition. (II) The motor coil is given a length, in the direction of the stroke of the oscillating element, which amounts at the most to 20% of the strokes in both directions. (III) The generator coil and the motor coil are to be fixedly disposed one next to the other so as to favor a steady increase of the triggering voltage incident to the swinging motion of the oscillating element.

The manner in which the features (I) to (III) fulfill the previously mentioned requirements will now be explained. The feature (I) fulfills the requirement (4) for the transistor operation because the working point upon the curve $I_C U_A$ will be at the bend of the curve, causing at relatively great fluctuations of the driving voltage $U_A$ only negligible variations in the driving current $I_C$. The feature (II) fulfills the requirement (3) very well, because the short length of the motor coil in the direction of the oscillations unquestionably produces short impulses. The feature (II) also fulfills the requirement (2). As has been found, the feature (III) in conjunction with the features (I) and (II) also fulfills the requirements (1), (2) and (5). Reference is for explanation made to FIG. 4 which shows that the workpoint P appears in accordance with feature (I) upon the curve $I_C U_A$ at the bend or transition point.

Another feature of the invention is concerned with avoiding irregularities in the mechanical operation of the clock that might possibly be caused by the electronic circuit arrangement. One of the detrimental actions of most transistors resides in the sensitivity to temperature. In the presence of considerable temperature fluctuations of the environment of the clock, this sensitivity could affect the clock operation within certain limits because the impulses amplified and/or generated by the transistor would as to magnitude depend on the temperature.

The disadvantage is in accordance with the invention avoided by the provision of mechanical and/or electrical means for producing temperature compensation of the semiconductor contained in the electronic switching arrangement.

The invention provides for this purpose, in the input and/or the output circuit of the semiconductor device which produces or amplifies the driving impulses for the mechanical oscillating system, at least one thermistor which is, so far as its ohmic resistance and its temperature coefficient are concerned, so dimensioned that the disturbing temperatures course of the semiconductor device is compensated as far as possible. For example, there may be provided, in the output circuit of the transistor, a suitably dimensioned thermistor in parallel and/or in series to the motor coil. A particularly favorable solution resides in making the ohmic stabilizing resistor 6 temperature dependent, that is, as a thermistor. A further structural element is thus avoided.

The temperature compensation may, however, also be effected mechanically, instead of or in addition to electrical means, by suitable utilization of a frequency-determining parameter of the mechanical oscillating element. A bimetal strip may for this purpose be arranged at a suitable place of the oscillating element or the suspension thereof, in such a manner, that the mechanical tuning, for example, the length of the pendulum rod is altered responsive to the effect of the outside temperature in a sense opposite to the temperature course of the transistor. A pneumatic temperature regulator may be employed, for example, instead of a bimetal strip.

FIG. 5 shows in simplified manner a clock pendulum with mechanical temperature compensation. FIG. 6 is a circuit diagram showing electronic control means.

Numeral 15 in FIG. 5, indicates a pendulum rod which carries at the lower end thereof a bracket 16 supporting within a tubular member 17 a permanent magnet 5. During the swinging of the pendulum, this magnet periodically enters into two fixedly disposed induction coils 2 and 3 acting respectively as generator and motor coils. At its upper end, the pendulum rod 15 is by means of a linkage 18 connected to a horizontally disposed bimetal strip 19 which is centrally thereof rotatably suspended from a fixed point 20. The bimetal strip 19 flexes responsive to temperature fluctuations to assume the shapes indicated in dotted lines, thereby respectively lengthening or shortening the pendulum rod and accordingly equalizing or compensating the effects of temperature fluctuations effecting the drive impulses generated by the transistor 1 in the drive coil 3, such impulses in turn effecting the actuation of the pendulum. To provide for further temperature compensation, the ohmic resistor 6 which is in accordance with FIG. 1 connected in parallel to the coil 3, is made as a thermistor.

The described embodiment may be modified by applying only one or the other of the temperature compensating means, namely, either the bimetal strip 19 and cooperating linkage 18 or the thermistor 6.

Corresponding temperature compensating means may also be used in connection with other mechanical oscillation systems including balance wheels.

FIGS. 7 and 8 show a further embodiment comprising a pendulum with temperature compensation means. The bimetal strip is in this case combined with the pendulum suspension. Numeral 21 indicates the pendulum hook which is suspended from nipples extending from the pendulum spring 22. Numeral 23 indicates the bimetal strip which affects the spacing between the point of rotation of the spring 22 and the mounting 24 depending upon the temperature. Numeral 25 indicates a structural part, for example, the rear wall of the corresponding clock.

Changes may be made within the scope and spirit of the appended claim.

I claim:

In an automatically operating electric time-keeping device having an oscillating member including permanent magnet means and disposed for motion therewith relative to two coils constituting respectively a generator coil and a motor coil respectively connected in feedback relationship in the input and output circuits of a transistor, means for stabilizing the operation of said transistor and for counteracting the tendency thereof to oscillate comprising a thermistor element connected in parallel with said motor coil, the coperation of said generator coil and said motor coil and said semiconductor device producing a characteristic with the work point lying upon the curve of the motor current in dependence upon the generator voltage at the point of transition of said curve, said oscillating member comprising a pendulum having an upper section pivotally supported at its upper end, and a lower section which carries said permanent magnet means, and means connecting said upper and lower sections including a bimetal strip, disposed to flex under temperature variations in a direction to compensate for the effect of such temperature variations upon said pendulum.

References Cited in the file of this patent

UNITED STATES PATENTS

| | | |
|---|---|---|
| 103,190 | Horton | May 17, 1870 |
| 594,365 | Adams | Nov. 30, 1897 |
| 1,833,613 | Devol | Oct. 18, 1932 |
| 2,640,175 | Morrison | May 26, 1953 |
| 2,644,892 | Gehman | July 7, 1953 |
| 2,831,114 | Overbeek | Apr. 15, 1958 |

FOREIGN PATENTS

| | | |
|---|---|---|
| 643,173 | France | May 10, 1928 |
| 1,090,564 | France | Oct. 20, 1954 |